United States Patent [19]
Ward et al.

[11] Patent Number: 5,498,164
[45] Date of Patent: Mar. 12, 1996

[54] AUTOMOTIVE STEERING COLUMN ELECTRICAL CONNECTOR

[76] Inventors: Mark C. Ward, 1061 Troon, St. Clair, Mich. 48079; Roger A. Hodder, 32312 Farmersville, Farmington Hills, Mich. 48334

[21] Appl. No.: 240,006

[22] Filed: May 9, 1994

[51] Int. Cl.$^6$ .................................................. H01R 39/00
[52] U.S. Cl. ............................................. 439/15; 439/5
[58] Field of Search .................................. 439/5, 15, 13, 439/17, 20, 21, 22, 24, 271

[56] References Cited

U.S. PATENT DOCUMENTS

| | | |
|---|---|---|
| 3,099,401 | 7/1963 | Bell. |
| 3,317,878 | 5/1967 | Garls et al. ................................. 439/5 |
| 3,972,577 | 8/1976 | Charles et al. .............................. 439/5 |

FOREIGN PATENT DOCUMENTS

| 777335 | 6/1957 | United Kingdom ....................... 439/5 |
|---|---|---|

OTHER PUBLICATIONS

"Recycling Air Bags Shapes" *Ward's Auto World* p. 26 Dated: Feb. 1994. Written by Drew Winter.
Photograph of a Conventional Clock Spring Electrical Connector of the Kind Disclosed in "Recycling Air Bags Shapes" Ward's Auto World, p. 26, Feb. 1994.

*Primary Examiner*—David L. Pirlot
*Attorney, Agent, or Firm*—Peter D. Keefe

[57] ABSTRACT

An electrical connector for a steering wheel which utilizes a non-wear electrical interconnection characterized by terminals of a base terminal bus and terminals of a rotor terminal bus being physically separated yet mutually electrically connected via contact with an electrically conductive liquid situated in one or more annular chambers located between outer faces of a rotor plate and a base plate. The rotor terminal bus is connected with the rotor plate and the base terminal bus is connected with the base plate. The base and rotor plates are connected together in a manner that permits relative rotation therebetween. The electrically conductive liquid is provided in each of the annular chambers by being preferably injected through a hollow capillary of at least one of the rotor and base terminals of each annular chamber, and then sealed, such as by solder. Preferred electrically conductive liquids include mercury or silicone. Electrical wiring is connected with each of the rotor terminal bus and the base terminal bus in an otherwise conventional manner known in the automotive art.

16 Claims, 3 Drawing Sheets

AUTOMOTIVE STEERING COLUMN ELECTRICAL CONNECTOR

BACKGROUND OF THE INVENTION

1. Field of the Invention

The present invention relates to electrical connectors used in automotive steering columns to provide electrical interconnection between rotative and stationary components thereof. More particularly, the present invention relates to an electrical connector of the aforesaid class which utilizes an electrically conductive liquid to provide electrical interconnection between mutually nontouching rotor and base terminals thereof.

2. Description of the Prior Art

Automotive vehicles have become increasingly sophisticated, both electronically and mechanically. One of the aspects of this sophistication is the introduction of air bag systems which are deployed in the event of a collision. For the driver, the logical choice location of the air bag is at the center hub of the steering wheel. However, in order for the air bag to be so located, the electrical systems associated with its actuation must accommodate the rotative movements of the steering wheel during driving of the vehicle. Other aspects of the aforementioned sophistication are steering wheel mounted controls for the horn, radio, cruise control and other electrically operated devices. These controls must also accommodate the rotative movements of the steering wheel. Accordingly, it has been industry practice to include an electrical connector within the steering column, wherein a first wiring connected with stationary components is connected with a second wiring connected with the rotative components on the steering wheel.

One conventional electrical connector in wide use is a clock spring electrical connector, sometimes referred to as a "coil". The clock spring electrical connector is of a cylindrical shape, having a base connected with the stationary components of the steering column, and a rotor which is rotatably connected with the base and connected with the rotative components of the steering column and/or the steering wheel. Internal to the base and rotor is a spirally wound, flat, multi-wire ribbon cable. The ribbon cable connects at one end to a first connection at the base, and connects at its other end to a second connection at the rotor. First wiring from the stationary portion of the vehicle connects with the first connection at the base. Second wiring from the steering wheel connects with the second connection at the rotor. Accordingly, electrical controls on the steering wheel are electrically connected to stationary parts of the vehicle, with rotative movements of the steering wheel being accommodated by the ribbon cable spiraling more or less tightly.

It is also possible to provide an electrical connector using a plurality of mutually electrically isolated slip rings, wherein respective brushes slidably contact therewith to thereby provide electrical contact between stationary and rotative components. One or the other of the slip rings and the brushes are mounted to a base and a rotor. The base is connected with the stationary components of the steering column and the rotor is rotatably connected with the base and connected with the rotative components of the steering column and/or the steering wheel.

The aforementioned conventional electrical connectors have a number of drawbacks. For example, the clock spring electrical connector utilizes a ribbon cable which is constantly undergoing movements which may tend to degrade the wires thereof at the first and second connections. Also, the clock spring coil is necessarily limited in how many rotations it can accommodate in any one direction; and because of the length of the ribbon cable, some resistive loss can be expected. Further for example, the slip ring and brushes type electrical connector involves considerable wear and the possibility of unreliable electrical contact.

Accordingly, what remains needed in the art is an electrical connector for a steering column which does not require either spirally wound wiring or slip rings and brushes to accommodate rotation of the steering wheel.

SUMMARY OF THE INVENTION

The present invention is an electrical connector for a steering wheel which utilizes a non-wear electrical interconnection characterized by terminals of a base and terminals of a rotor being physically separated yet mutually electrically connected via contact with an electrically conductive liquid situated in one or more annular chambers.

The electrical connector according to the present invention is composed of a disc shaped base having a hub aperture, a disc shaped rotor rotatively connected to the stator wherein the rotor also has a hub aperture, an annular elastomeric gasket located between the stator and rotor, a plurality of annular chambers formed in at least one of the base, the rotor and the gasket, a base terminal bus connected with the base wherein the base terminal bus has a plurality of stator terminals each of which respectively projecting into an annular chamber, a rotor terminal bus connected with the rotor wherein the rotor terminal bus has a plurality of rotor terminals each of which respectively projecting into an annular chamber and wherein further each rotor terminal is paired with a respective base terminal, and an electrically conductive liquid located in each of the annular chambers to thereby provide electrical conduction between each of the paired base and rotor terminals. The base and rotor terminals are dimensioned with respect to the annular chambers so that they do not mutually physically touch, nor physically touch anything other than the electrically conductive liquid.

In the preferred embodiment, the elastomeric gasket is fixedly connected with an inner face of the base and the elastomeric gasket is provided with sealing ribs which sealably engage an inner surface of the rotor between each annular chamber and on either side of the outermost and innermost annular chambers. The rotor and base are snappingly mutually engaged to thereby provide the aforesaid sealing.

The electrically conductive liquid is provided in each of the annular chambers by being preferably injected through a hollow capillary of at least one of the rotor and base terminals of each annular chamber, and then sealed, such as by solder. Preferred electrically conductive liquids include mercury or silicone.

Electrical wiring is connected with each of the rotor terminal bus and the base terminal bus in an otherwise conventional manner known in the automotive art.

In operation, as the rotor turns with the steering wheel and the base remains stationary, the rotor terminals will rotate with respect to the base terminals. The electrically conductive liquid will conduct electricity between each of the paired rotor and base terminals of each annular chamber.

Accordingly, it is an object of the present invention to provide an electrical connector which accommodates rotation between base and rotor components thereof, wherein electrical conduction between rotor terminals and base terminals is provided via contact with an electrically conductive liquid.

It is an additional object of the present invention to provide an electrical connector which accommodates rotation between base and rotor components thereof, wherein electrical conduction between rotor terminals and base terminals is provided via an electrically conductive liquid situated in a plurality of discrete annular chambers, a rotor terminal and a base terminal projecting into each annular chamber so as to be physically mutually separated yet be electrically connected via contact with the electrically conductive liquid situated therein.

These, and additional objects, advantages, features and benefits of the present invention will become apparent from the following specification.

DETAILED DESCRIPTION OF THE PREFERRED EMBODIMENT

Figure 1:
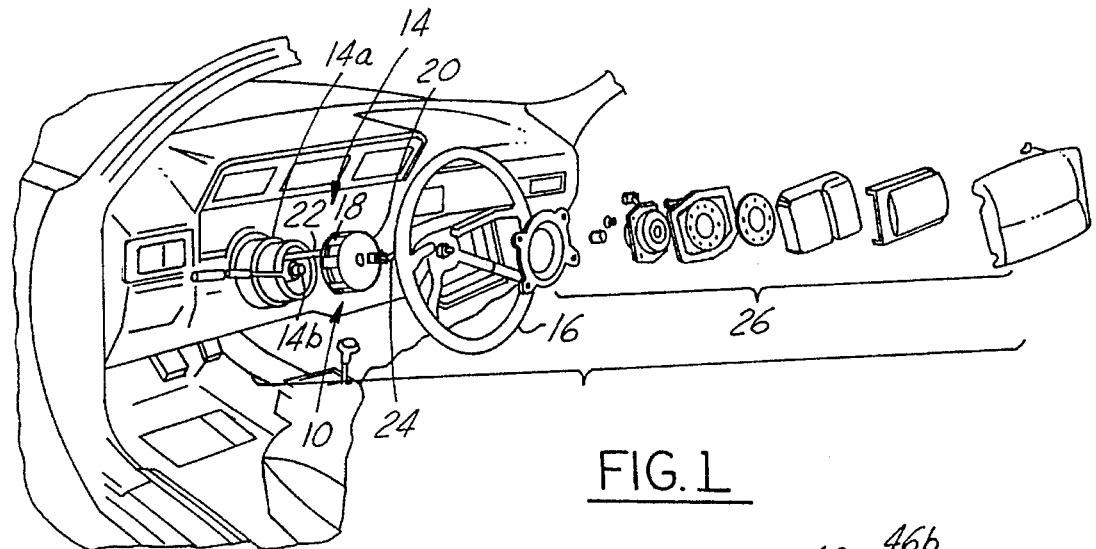
FIG. 1 is a perspective view of an automobile interior, showing in particular an exploded view of a steering column equipped with the electrical connector according to the present invention.

Referring now to FIG. 1, the preferred environment of operation of the electrical connector 10 according to the present invention is illustrated. An automobile 12 is provided with a steering column 14 having a stationary portion 14a and a rotative portion 14b, wherein a steering wheel 16 is connected with the rotative portion. The electrical connector 10 is provided with a base 18 connected with the stationary portion 14a of the steering column 14. The electrical connector 10 is further provided with a rotor 20 which is rotatably connected with the base 18 and connected with at least one of the rotative portion 14b of the steering column 14 and the steering wheel 16. A first wiring 22 extends from the stationary portion 14a of the steering column 14 and connects with the base 18. A second wiring 24 extends from the steering wheel 16 and connects with the rotor 20. The electrical connector 10 provides electrical continuity between the first wiring 22 and the second wiring 24.

In the example depicted in FIG. 1, the first and second wiring 22, 24 are used in part to electrically connect an air bag system 26 with respect to the steering wheel 16 and the stationary components of the automobile 12. While this is a preferred typical environment of use of the electrical connector 10, those having ordinary skill in the electrical and mechanical arts will immediately appreciate that the electrical connector 10 may be used in any application wherein an electrical connection is desired between mutually rotating components.

Referring now in addition to FIGS. 2 through 7, a more detailed description of the structure and function of the present invention will be detailed.

As can be understood by reference to FIGS. 1, 3, 5 and 7, the rotor 20, preferably of plastic, is disc shaped, having a rotor plate 28, a rotor outer wall 30a and a rotor hub wall 30b located adjacent a hub aperture 32 through which passes the rotative portion 14b of the steering column 14. A hub washer 25 is connected with the rotor plate 28, wherein the hub washer has flats 25a which engage flats on the rotative portion 14b of the steering column 14 to thereby cause the rotor 20 to rotate therewith. Of course, other connection structures for securing the rotor 20 with the rotative portion 14b can be substituted for the flats 25a.

Figure 5:
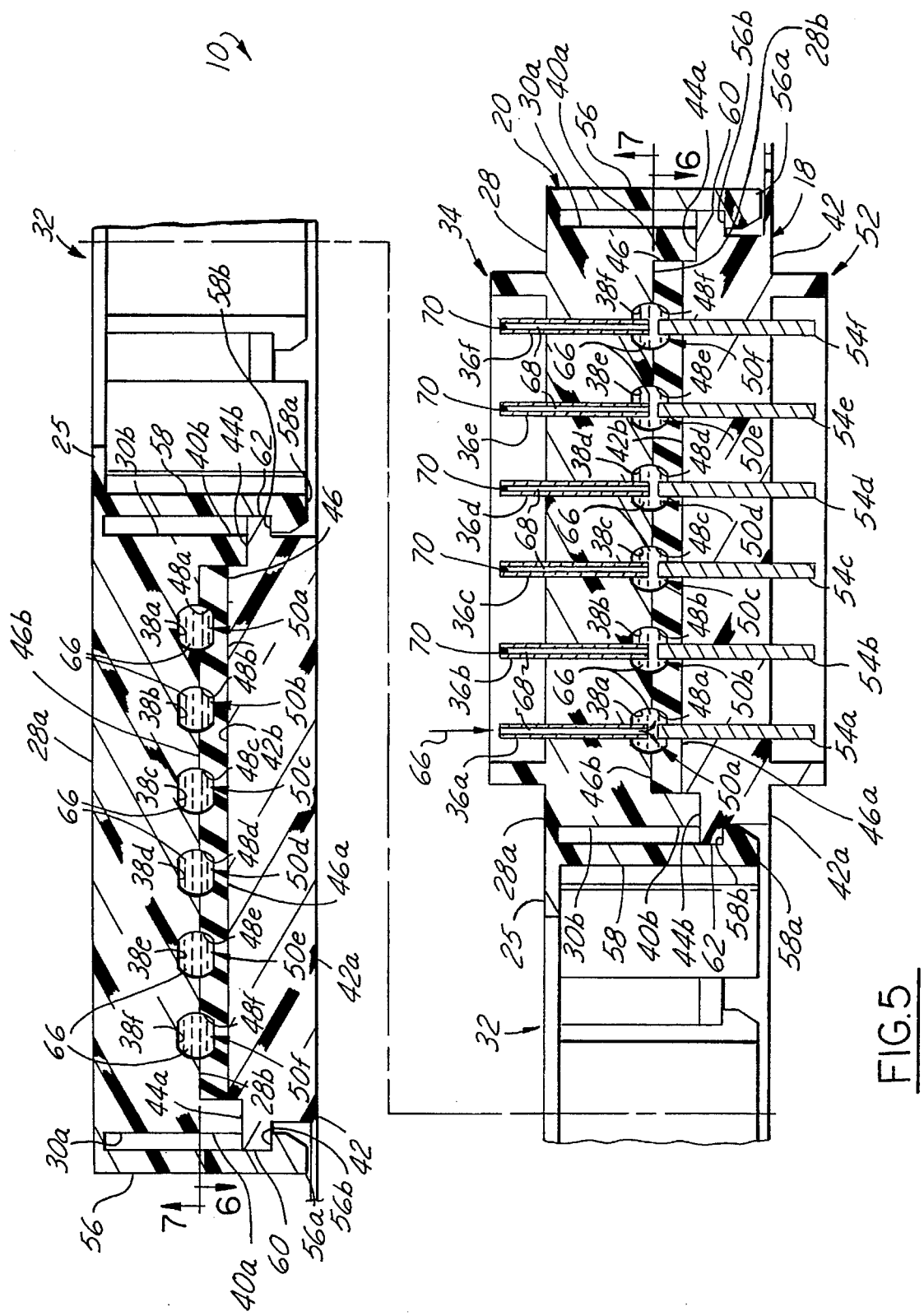
FIG. 5 is a partly sectional view of the electrical connector according to the present invention, seen along line 5—5 in FIG. 2.

A rotor terminal bus 34 is provided at the outer face 28a of the rotor plate 28, extending radially from the rotor hub wall 30b toward the rotor outer wall 30a. The rotor terminal bus 34 has a plurality of rotor terminals 36a through 36f. Of course, the actual number of rotor terminals may be otherwise. The rotor terminal bus 34 is structured to interface with the second wiring 24 in a conventional manner. As can best be seen in FIG. 5, the rotor terminals 36a through 36f extend through the rotor plate 28 and enter into respective annular grooves 38a through 38f formed in the inner face 28b of the rotor plate 28. As can best be understood from FIG. 7, the annular grooves 38a through 38f are discrete, mutually spaced apart and concentric. As shown in FIG. 5, the rotor outer wall 30a includes an outer flange 40a adjoining the inner face 28b of the rotor plate 28, and the rotor hub wall 30b includes a hub flange 40b also adjoining the inner face 28b of the rotor plate.

As can be understood by reference to FIGS. 3 through 6, the base 18, preferably of plastic, is disc shaped, having a diameter similar to that of the rotor 20. The base 18 includes a base plate 42 having an outer face 42a and an inner face 42b. Adjoining the inner face 42b of the base plate 42 is an annular outer recess 44a and an annular hub recess 44b. An outer face 46a of an elastomeric gasket 46 is affixed with respect to the inner face 42b of the base plate 42. In this regard, it is preferred to utilize a double-shot forming method in which the plastic of the base 18 is first injected into a mold, then the elastomeric gasket material is injected into the mold, whereupon the inner face 42b of the base plate 42 adheres with respect to the outer face 46a of the elastomeric gasket 46.

Figure 8:
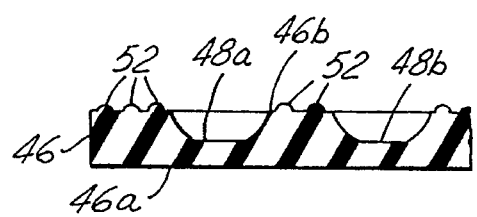
FIG. 8 is a broken-away sectional side view of the elastomeric gasket according to the present invention, showing in particular surface structure for ensuring sealing with respect to another, abutting surface.
Figure 2:
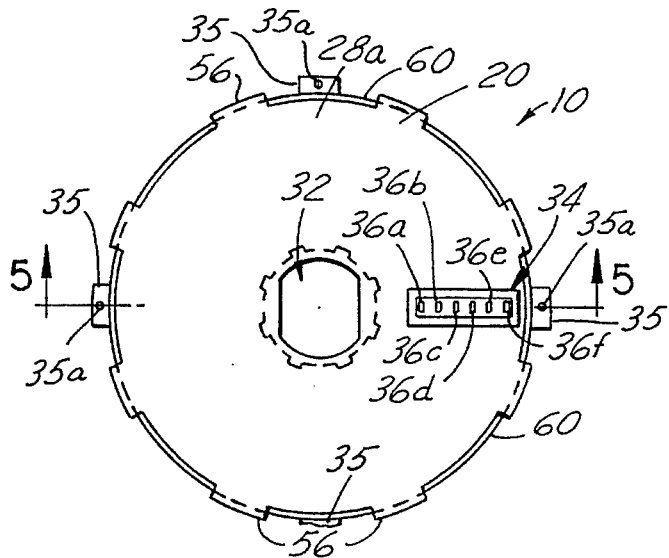
FIG. 2 is a top plan view of the electrical connector according to the present invention.
Figure 3:
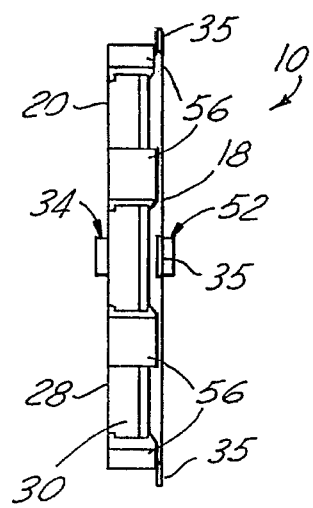
FIG. 3 is a side view of the electrical connector according to the present invention.
Figure 4:
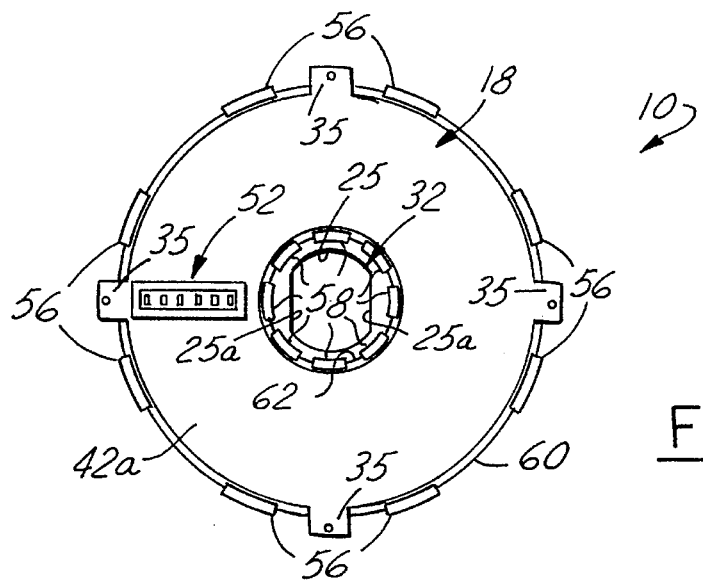
FIG. 4 is a bottom plan view of the electrical connector according to the present invention.
Figure 6:
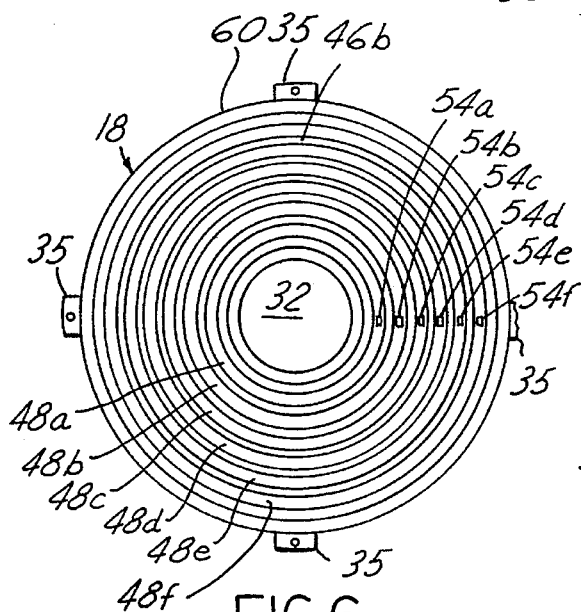
FIG. 6 is a partly sectional view of the electrical connector according to the present invention, seen along line 6—6 in FIG. 5.
Figure 7:
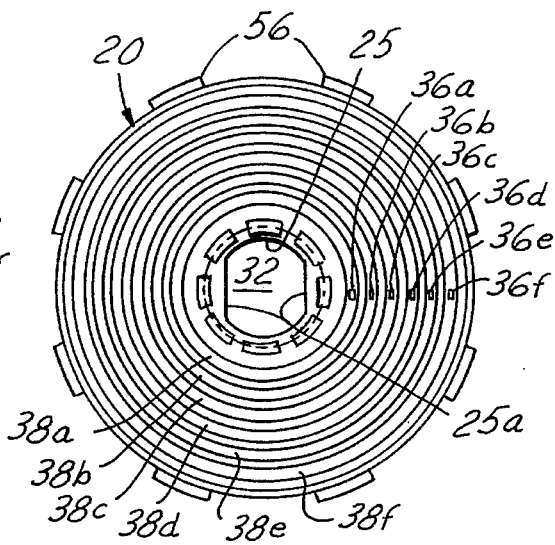
FIG. 7 is a partly sectional view of the electrical connector according to the present invention, seen along line 7—7 in FIG. 5.

An inner face 46b of the elastomeric gasket 46a is provided with a plurality of discrete, mutually spaced apart and concentric grooves 48a through 48f which are aligned to coincide, respectively, with the grooves 38a through 38f in the inner face 28b of the rotor plate 28 to form a plurality of discrete, mutually spaced apart and concentric annular chambers 50a though 50f, as shown in FIG. 5. Preferably, the inner face 46b of the elastomeric gasket 46 is provided with one or more concentric sealing ribs 52 (for example, three concentric sealing ribs adjacent the outer and hub recesses 44a, 44b and two concentric sealing ribs between adjacent annular channels 50a through 50f) which are compressed when the inner face 46b of the elastomeric gasket 46 sealingly abuts the inner face 28b of the rotor plate 28, to thereby provide enhanced sealing on each side of the annular chambers 50b through 50b, as shown in FIG. 8.

The outer face 42a of the base plate 42 has connected therewith a base terminal bus 52. The base terminal bus 52 is provided with a plurality of base terminals 54a through 54f; the number of which matches the number of rotor terminals, so that each base terminal is uniquely paired with a rotor terminal. The base terminal bus 52 is structured to interface with the first wiring 22 in a conventional manner. The base terminals 54a through 54f project through the base plate 42 and the elastomeric gasket 46 and extend into respective annular grooves 48a through 48f of the elastomeric gasket 46.

As can be discerned from FIG. 5, the rotor terminals 36a through 36b are spaced from the respectively paired base terminals 54a through 54f so that they do not mutually touch; further, the rotor terminals do not touch the inner face 46a of the elastomeric gasket 46 and the base terminals do not touch the inner face 28b of the rotor plate 28. Each of the rotor terminals 36a through 36f is sealingly anchored in the rotor plate 28, and each of the base terminals 54a through 54f is sealingly anchored in the elastomeric gasket 46 and the base plate 42.

In order to seal the base 18 with respect to the rotor 20 so that each of the annular chambers 50a through 50f are discreetly sealed, the base must be tightly affixed to the rotor; yet the rotor must be rotatable with respect to the base. In this regard, it is preferred to tightly abut the base 18 with respect to the rotor 20 by a snapping fit interrelationship therebetween. A plurality of outer arms 56 are connected with the rotor plate 28 and arranged in a regular spacing adjacent the outer wall 30a of the rotor 20; further, a plurality of hub arms 58 are connected with the rotor plate and arranged in a regular spacing adjacent the hub wall 30b of the rotor. The outer arms 56 are provided with an outer arm head 56a having an outer arm tab 56b facing toward the base plate 42. Similarly, the hub arms 58 are provided with a hub arm head 58a having a hub arm tab 58b facing toward the base plate 42. An annular outer ring 60 is provided on the base plate 42 adjoining the annular outer recess 44a, and an annular hub ring 62 is provided on the base plate adjoining the annular hub recess 44b.

Figure 9:
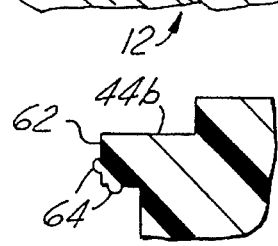
FIG. 9 is a broken-away sectional side view of the base according to the present invention, showing in particular surface structure for preventing rattle and loosening with respect to another, abutting surface.

The aforementioned snapping fit interrelationship is provided by the outer arm tabs 56b engaging the annular outer ring 60 and the hub arm tabs 58b engaging the annular hub ring 62, as shown in FIG. 5. It is preferred to include nibs 64 on the surface of the outer and hub annular rings 60, 62, as shown in FIG. 9, which compress when the outer arm and hub arm tabs 56b, 58b respectively engage therewith to thereby prevent rattling or loosening of the outer and hub arms 56, 58 with respect to the base plate 42. This structure seals each of the annular channels 50a through 50f, yet provides for rotation of the rotor 20 with respect to the base 18 via the outer arm and hub arm tabs 56b, 58b sliding, respectively, on the outer and hub rings 60, 62. Also, it should be noted that while the aforementioned snapping fit interconnection is preferred, other interconnection structures can be used to fasten the rotor 20 to the base 18.

It will be noted from reference to FIG. 5 that when the outer arm and hub arm tabs 56b, 58b snap onto, respectively the outer and hub rings 60, 62, the inner face 46b of the elastomeric gasket 46 seats within the outer and hub flanges 40a, 40b and against the inner face 28b of the rotor plate 28, while the outer and hub flanges respectively abut the outer and hub recesses 44a, 44b. This structural interrelationship affords a sound, tight and reliable connection between the rotor 20 and the base 18 which allows the rotor to be rotated with respect to the base, yet the annular channels will nonetheless remain at all times sealed.

To connect the base 18 to the stationary portion 14a of the steering wheel 14, ears 35 having holes 35a therein are connected with the base plate 42 adjacent the outer face 42a thereof, in a regularly mutually spaced relation, wherein a threaded fastener passes through the holes to thereupon engage threaded bores in the stationary portion of the steering column. Of course, other connection structures for connecting the base 18 to the stationary portion 14a may be substituted for the ears 35.

An electrically conductive liquid 66 is placed into each of the annular chambers 50a through 50f to thereby provide electrical conduction exclusively between each of the paired rotor and base terminals. Thus, the electrically conductive liquid 66 exclusively conducts electricity between rotor terminal 36a and base terminal 54a, exclusively between rotor terminal 36b and base terminal 54b, exclusively between rotor terminal 36c and base terminal 54c, exclusively between rotor terminal 36d and base terminal 54d, exclusively between rotor terminal 36e and base terminal 54e, and exclusively between rotor terminal 36f and base terminal 54f. This exclusivity of electrical conduction by the electrically conductive liquid 64 is provided whatever the relative rotative position of the rotor terminal bus 34 with respect to the base terminal bus 52 as the rotor 20 rotates relative to the base 18. Preferred electrically conductive liquids include mercury or silicone. The electrically conductive liquid may include a homogeneous suspension of electrically conductive particles. Other electrically conductive liquids may also be used. Should the electrically conductive liquid change volume due to temperature variation, the elastomeric gasket will compensate therefor without compromising the seal of any of the annular channels.

As shown in FIG. 5, a preferred way to introduce the electrically conductive liquid 66 into each of the annular chambers 50a through 50f is to inject it into a capillary 68 of either the rotor terminals 36a through 36f or the base terminals 54a through 54f (the rotor terminals being shown therewith), and then seal the capillary with solder 70. Alternatively, the electrically conductive liquid 66 can be introduced through a sealable entry port in the base 18 or the rotor 20.

In operation, the user connects the first and second wiring to the respective base terminal and rotor terminal and seats the base with respect to the stationary components of the automobile or other device so that the base remains unmoving with respect thereto, and then seats the rotor with respect to the rotative components so that the rotor is unmoving with respect thereto. When the stationary components are rotated with respect to the moving components, the rotor will rotate with respect to the base and the electrically conductive liquid will conduct electricity along each of the annular channels between each of the paired rotor and base terminals to thereby provide electricity between the first and second wiring.

To those skilled in the art to which this invention appertains, the above described preferred embodiment may be subject to change or modification. For example, the annular channels may be located in any of the rotor, elastomer gasket or the base, or any combination thereof. Further for example, more than one base terminal bus or more than one rotor terminal bus may be provided. Such change or modification can be carried out without departing from the scope of the invention, which is intended to be limited only by the scope of the appended claims.

What is claimed is:

1. An electrical connector for providing electrical continuity between a first wiring and a second wiring, wherein the first wiring is rotatable with respect to the second wiring, said electrical connector comprising:

annular channel means for providing at least one sealed annular channel;

an electrically conductive liquid located in said at least one annular channel;

base bus terminal means connected With said annular channel means for selectively connecting a first wiring with said electrically conductive liquid, said base bus terminal means comprising at least one base terminal located at a discrete point location of said base bus terminal means;

rotor bus terminal means connected with said annular channel means for selectively connecting a second wiring with said electrically conductive liquid, said rotor bus terminal means being spaced from said base bus terminal means, said rotor bus terminal means comprising at least one rotor terminal located at a discrete point location with respect to said rotor bus terminal means; and means for providing relative rotatability between said base bus terminal means and said rotor bus terminal means;

wherein the first wiring is electrically connected to the second wiring via selective discrete point contact of said at least one base terminal and said at least one rotor terminal with said electrically conductive liquid irrespective of relative rotation between said rotor bus terminal means and said base bus terminal means.

2. The electrical connector of claim 1, wherein said electrically conductive liquid is selected from the group consisting of mercury and silicone.

3. The electrical connector of claim 1, wherein the first wiring is connected in stationary relation to a first component, and the second wiring is connected in stationary relation to a second component, and wherein the second component is rotatable with respect to the first component; said electrical connector further comprising:

base connection means for connecting said base bus terminal means in stationary relation to the first component; and rotor connection means for connecting said rotor bus terminal means in stationary relation to the second component.

4. The electrical connector of claim 3, wherein said electrically conductive liquid is selected from the group consisting of mercury and silicone.

5. An electrical connector for providing electrical continuity between a first wiring and a second wiring, wherein the first wiring is rotatable with respect to the second wiring, said electrical connector comprising:

a rotor comprising a rotor plate, said rotor plate having an outer face and an opposite inner face;

a base comprising a base plate, said base plate having an outer face and an opposite inner face;

connecting means for connecting said rotor to said base, wherein said rotor is rotatable with respect to said base, wherein further said inner face of said rotor plate faces toward said inner face of said base plate;

gasket means located between said inner face of said rotor plate and said inner face of said base plate for providing selective sealing therebetween;

at least one annular channel formed in at least one of said inner face of said rotor plate, said inner face of said base plate and said gasket means, said gasket means providing sealing for said at least one annular channel with respect to at least one of said rotor plate and said base plate;

an electrically conductive liquid located in said at least one annular channel;

base bus terminal means connected with said base plate for selectively connecting a first wiring with said electrically conductive liquid; and rotor bus terminal means connected with said rotor plate for selectively connecting a second wiring with said electrically conductive liquid, said rotor bus terminal means being spaced from said base bus terminal means;

wherein the first wiring is electrically connected to the second wiring via selective contact of said base bus terminal means and said rotor bus terminal means with said electrically conductive liquid irrespective of relative rotation between said rotor plate and said base plate; and wherein said at least one annular channel is partly formed in said inner face of said rotor plate and partly formed in said gasket means.

6. An electrical connector for providing electrical continuity between a first wiring and a second wiring, wherein the first wiring is rotatable with respect to the second wiring, said electrical connector comprising:

a rotor comprising a rotor plate, said rotor plate having an outer face and an opposite inner face;

a base comprising a base plate, said base plate having an outer face and an opposite inner face;

connecting means for connecting said rotor to said base, wherein said rotor is rotatable with respect to said base, wherein further said inner face of said rotor plate faces toward said inner face of said base plate;

gasket means located between said inner face of said rotor plate and said inner face of said base plate for providing selective sealing therebetween;

at least one annular channel formed in at least one of said inner face of said rotor plate, said inner face of said base plate and said gasket means, said gasket means providing sealing for said at least one annular channel with respect to at least one of said rotor plate and said base plate;

an electrically conductive liquid located in said at least one annular channel;

base bus terminal means connected with said base plate for selectively connecting a first wiring with said electrically conductive liquid; and rotor bus terminal means connected with said rotor plate for selectively connecting a second wiring with said electrically conductive liquid, said rotor bus terminal means being spaced from said base bus terminal means;

wherein the first wiring is electrically connected to the second wiring via selective contact of said base bus terminal means and said rotor bus terminal means with said electrically conductive liquid irrespective of relative rotation between said rotor plate and said base plate;

wherein said connecting means provides a snapping interference connection between said base and said rotor; and wherein the first wiring is connected in stationary relation to a first component, and the second wiring is connected in stationary relation to a second component, and wherein the second component is rotatable with respect to the first component; said electrical connector further comprising:

base connection means for connecting said base in stationary relation to the first component; and rotor connection means for connecting said rotor in stationary relation to the second component.

7. The electrical connector of claim 6, wherein said base plate has a centrally disposed base hub aperture, and wherein said rotor plate has a centrally disposed rotor hub aperture; said connecting means comprising:

a plurality of outer arms connected with said rotor plate opposite said rotor hub aperture, each outer arm of said plurality of outer arms having a first tab;

a plurality of hub arms connected with said rotor plate at said rotor hub aperture, each hub arm of said plurality of hub arms having a second tab;

an outer ring connected with said base plate opposite said base hub aperture; and a hub ring connected with said base plate at said base hub aperture;

wherein said first tab of each said outer arm snappingly engages said outer ring and said second tab of each said hub arm snappingly engages said hub ring to thereby connect said rotor to said base.

8. The electrical connector of claim 7, wherein said at least one annular channel is partly formed in said inner face of said rotor plate and partly formed in said gasket means.

9. The electrical connector of claim 8, wherein said gasket means is affixed in stationary relation to said inner face of said base plate.

10. The electrical connector of claim 9, wherein said electrically conductive liquid is selected from the group consisting of mercury and silicone.

11. An electrical connector for providing electrical continuity between a first wiring and a second wiring, wherein the first wiring is rotatable with respect to the second wiring, said electrical connector comprising:

a rotor comprising a rotor plate, said rotor plate having an outer face and an opposite inner face;

a base comprising a base plate, said base plate having an outer face and an opposite inner face;

connecting means for connecting said rotor to said base, wherein said rotor is rotatable with respect to said base, wherein further said inner face of said rotor plate faces toward said inner face of said base plate;

gasket means located between said inner face of said rotor plate and said inner face of said base plate for providing selective sealing therebetween;

a plurality of discrete, mutually spaced apart, concentric annular channels formed in at least one of said inner face of said rotor plate, said inner face of said base plate and said gasket means, said gasket means providing sealing for each said annular channel with respect to at least one of said rotor plate and base plate;

an electrically conductive liquid located in each said annular channel, the electrically conductive liquid in each said annular channel being mutually electrically isolated;

a base bus terminal comprising a plurality of base terminals sealingly connected with said base plate, each base terminal contacting the electrically conductive liquid of a respective said annular channel, said base bus terminal being structured to connect to a first wiring; and a rotor bus terminal comprising a plurality of rotor terminals sealingly connected with said rotor plate, each said rotor terminal contacting the electrically conductive liquid of a respective said annular channel, said rotor bus terminal being structured to connect to a second wiring, the base terminal being mutually separated from the rotor terminal of each annular channel respective thereto;

wherein the first wiring is electrically connected to the second wiring via contact of each said base terminal and each said rotor terminal with the electrically conductive liquid of the annular channel respective thereto irrespective of relative rotation between said rotor plate and said base plate;

wherein the first wiring is connected in stationary relation to a first component, and the second wiring is connected in stationary relation to a second component, and wherein the second component is rotatable with respect to the first component; said electrical connector further comprising:

base connection means for connecting said base in stationary relation to the first component; and rotor connection means for connecting said rotor in stationary relation to the second component; and wherein the first component is a stationary portion of a steering column and the second component is a rotative portion of a steering column; wherein said base plate has a centrally disposed base hub aperture, and wherein said rotor plate has a centrally disposed rotor hub aperture, said base hub aperture and said rotor hub aperture receiving therethrough the rotative portion of the steering column.

12. The electrical connector of claim 11, wherein the first component is a stationary portion of a steering column and the second component is a rotative portion of a steering column; wherein said base plate has a centrally disposed base hub aperture, and wherein said rotor plate has a centrally disposed rotor hub aperture, said base hub aperture and said rotor hub aperture receiving therethrough the rotative portion of the steering column.

13. The electrical connector of claim 11, wherein said connecting means provides a snapping interference connection between said base and said rotor, said connecting means comprising:

a plurality of outer arms connected with said rotor plate opposite said rotor hub aperture, each outer arm of said plurality of outer arms having a first tab;

a plurality of hub arms connected with said rotor plate at said rotor hub aperture, each hub arm of said plurality of hub arms having a second tab;

an outer ring connected with said base plate opposite said base hub aperture; and a hub ring connected with said base plate at said base hub aperture;

wherein said first tab of each said outer arm snappingly engages said outer ring and said second tab of each said hub arm snappingly engages said hub ring to thereby connect said rotor to said base.

14. The electrical connector of claim 13, wherein said at least one annular channel is partly formed in said inner face of said rotor plate and partly formed in said gasket means, and wherein said gasket means is affixed in stationary relation to said inner face of said base plate.

15. The electrical connector of claim 14, wherein said electrically conductive liquid is selected from the group consisting of mercury and silicone.

16. The electrical connector of claim 1, wherein:

said annular channel means provides a plurality of discrete, mutually spaced apart, concentric sealed annular channels;

said electrically conductive liquid is located in each said sealed annular channel, the electrically conductive liquid in each said sealed annular channel being mutually electrically isolated;

said base bus terminal means comprises a plurality of base terminals, each base terminal being located at a respective discrete point location of said base bus terminal means, each base terminal having discrete point contact with the electrically conductive liquid of a respective said sealed annular channel, said plurality of base terminals being connected to a first wiring; and said rotor bus terminal means comprises a plurality of rotor terminals, each rotor terminal being located at a respective discrete point location of said rotor bus terminal means, each rotor terminal having discrete point contact with the electrically conductive liquid of a respective said sealed annular channel, said plurality of rotor terminals being connected to a second wiring, wherein each base terminal is mutually separated from the rotor terminal of each sealed annular channel respective thereto;

wherein the first wiring is electrically connected to the second wiring via contact of each said base terminal and each said rotor terminal with the electrically conductive liquid of the annular channel respective thereto irrespective of relative rotation between said rotor bus terminal means and said base bus terminal means.

* * * * *